United States Patent
Ellis et al.

(10) Patent No.: US 7,222,165 B1
(45) Date of Patent: May 22, 2007

(54) SERVICE PROVISION SUPPORT SYSTEM

(75) Inventors: Martin John Ellis, Wiltshire (GB); Jeffrey Roger Farr, Suffolk (GB); Duncan Charles James-Bell, Wiltshire (GB); Nigel Warren, Berkshire (GB)

(73) Assignee: British Telecommunications plc, London (GB)

( * ) Notice: Subject to any disclaimer, the term of this patent is extended or adjusted under 35 U.S.C. 154(b) by 0 days.

(21) Appl. No.: 09/674,073

(22) PCT Filed: May 26, 1999

(86) PCT No.: PCT/GB99/01661

§ 371 (c)(1),
(2), (4) Date: Oct. 26, 2000

(87) PCT Pub. No.: WO99/62272

PCT Pub. Date: Dec. 2, 1999

(30) Foreign Application Priority Data

May 26, 1998 (EP) .................................. 98304144
May 26, 1998 (GB) .................................. 9811267.5

(51) Int. Cl.
*G06F 15/173* (2006.01)
(52) U.S. Cl. .................... 709/223; 709/224; 705/40; 370/395.1; 370/395.21
(58) Field of Classification Search ......... 709/200–253
See application file for complete search history.

(56) References Cited

U.S. PATENT DOCUMENTS

| | | | | |
|---|---|---|---|---|
| 4,481,383 A | * | 11/1984 | Madon .................. | 379/115.01 |
| 4,980,826 A | * | 12/1990 | Wagner .................. | 705/37 |
| 5,631,904 A | * | 5/1997 | Fitser et al. ............. | 370/261 |
| 5,682,482 A | * | 10/1997 | Burt et al. ............... | 705/42 |
| 5,905,736 A | * | 5/1999 | Ronen et al. ............ | 370/546 |
| 5,960,416 A | * | 9/1999 | Block ..................... | 705/34 |
| 6,023,499 A | * | 2/2000 | Mansey et al. .......... | 379/111 |
| 6,035,281 A | * | 3/2000 | Crosskey et al. ........ | 705/14 |
| 6,047,051 A | * | 4/2000 | Ginzboorg et al. ...... | 379/130 |
| 6,073,160 A | * | 6/2000 | Grantham et al. ....... | 709/200 |
| 6,240,402 B1 | * | 5/2001 | Lynch-Aird ............. | 705/400 |
| 6,330,586 B1 | * | 12/2001 | Yates et al. ............. | 709/201 |
| 6,445,782 B1 | * | 9/2002 | Elfe et al. ............... | 379/201.01 |
| 6,519,248 B1 | * | 2/2003 | Valko .................... | 370/352 |
| 6,611,501 B1 | * | 8/2003 | Owen et al. ............. | 370/254 |

(Continued)

OTHER PUBLICATIONS

Pavon et al, "The Vital Network Resource Architecture" Proceedings TINA '97—Global Convergence of Telecommunications and Distributed Object Computing, Nov. 17-20, 1997, pp. 130-138, XP002082940.

(Continued)

*Primary Examiner*—Bunjob Jaroenchonwanit
*Assistant Examiner*—Dohm Chankong
(74) *Attorney, Agent, or Firm*—Nixon & Vanderhye P.C.

(57) ABSTRACT

A communications service provision support system supports multiple different types of services during a service session. The system when in use comprises a session manager which performs functions generic to each of the multiple different types of services during service sessions. For each of the multiple types of services, the session manager is arranged during a service session to generate event messages indicating at least one discrete change which has just occurred in the session-related status of individual users of the system without any historical data, and to transmit the event messages to an event handler for processing.

19 Claims, 8 Drawing Sheets

U.S. PATENT DOCUMENTS 6,674,759 B1 * 1/2004 Christie et al. ............. 370/410

OTHER PUBLICATIONS

Hellemans et al, "TINA Service Architecture: From Specification to Implementation", Proceedings TINA '97—Global Convergence of Telecommunications and Distributed Object Computing, Nov. 17-20, 1997, pp. 174-183, XP002082032.

Abarca et al, "Network Resource Architecture (Version 3.0)" Feb. 10, 1997, Telecommunications Information Networking Architecture Consortium, HTTP://WWW.TINAC.COM XP002082942.

Abarca et al, "Service Architecture (Version 5.0)" Jun. 16, 1997, Telecommunications Information Networking Architecture Consortium, HTTP://WWW.TINAC.COM XP002082943.

De Zen et al, "Value-added Internet: a Pragmatic TINA-based Path to the Internet and PSTN Integration" Proceedings TINA '97—Global Convergence of Telecommunications and Distributed Object Computing, Nov. 17-20, 1997, pp. 13-21, XP002082941.

TINA: "Overall Concepts and Principles of TINA", Version 1.0, Feb. 17, 1995, pp. 1-1 to 10-2.

TINA: "Service Component Specification", Version 1.0b, Jan. 19, 1998, pp. 1-251.

TINA: "Service Architecture", Version 5.0, Jun. 16, 1997, pp. 1-76.

TINA: "Network Resource Architecture", Version 3.0, Feb. 1997, pp. 1-232.

* cited by examiner

- - -> INSTANTIATION
——•> EVENT CHANNEL COMMUNICATION

1

SERVICE PROVISION SUPPORT SYSTEM

BACKGROUND

1. Field of Invention

This invention relates to a telecommunications service provision support system, which supports a plurality of different types of services provided in the form of service-specific data processing during a service session.

2. Description of Related Art

It has been known for service providers to provide different types of services via a retailer party to customers, thereby simplifying the access to services at least from the customers point of view.

The price charged to a customer is determined by parameters and pricing schemes set by the service provider. The service provider generates a notification of the price to be charged for the provision of a particular type of service, which may be actually charged by the service retailer. Service providers therefore implement pricing logic within their services.

The paper "Operational Support Systems For The Future", D Freestone and M Owen, BT Technology Journal, Vol. 14, No. 3, July 1996, describes an operational support system (OSS) which provides pricing and billing functions along with other functions such as provisioning, portfolio management and customer help. The paper proposes an approach for delivering flexible, inter-operable business services, and standardised application programming interfaces (APIs) to allow information services from multiple service providers to be packaged together via common interfaces. Notably, the pricing functionality described include the information services generated streams of chargeable "events". "Events" in this case are only generated by the information services provider if they are considered chargeable, and the choice of such chargeable events is made at the time of construction of the service. The pricing options exemplified include a subscription-type pricing policy, which is known to be a one-off chargeable event. A further policy type is a policy of pricing by content, which requires the number of units of the content to be known from the event parameters. A further policy type exemplified is pricing by duration, which requires the start time and end time to be known from the event parameters.

In this regard, chargeable events, other than subscription-type events, have in the past been generated not as a record of an instantaneous event, but as what as may be referred to as a "combined" event, generated when instantaneous events are logically combined. For example, in conventional telephony, a chargeable event is recorded in a call record, which specifies the duration of the call by means of both a start time and an end time. In this sense, the chargeable event recorded in the call record is a "combined" event, consisting of data specifying more than one instantaneous event.

BRIEF SUMMARY OF THE INVENTION

In accordance with an aspect of the present invention there is provided a communications service provision support system which supports multiple different types of services during service sessions, said system when in use comprising a session manager which performs functions generic to each of said multiple different types of services during service sessions;

wherein for each of said multiple types of services, said session manager is arranged during a service session, in which a plurality of participants participate, to generate event messages indicating discrete changes in the session-related status of individual users of the system and to transmit said event messages to an event handler for processing.

By the session manager generating event messages indicating discrete changes in the session-related status of users during a service session, the need for the preselection of chargeable events by the service provider may be alleviated. Instead, by filtering events from a known set of events notified by the session manager, and/or logically combining events generated from that set, pricing and/or costing of usage during a service session may be performed independently of the service provision.

Furthermore, the events generated by the session manager may be automatically forwarded for logging and subsequent analysis in a service usage analysis engine.

In accordance with a further aspect of the invention there is provided a method of notifying events occurring during a multi-party service session in a communications service provision support system, said method comprising:

generating a plurality of event messages during a service session in which a plurality of participants participate, each said event message being generated in response to a discrete change in the session-related status of individual users of the system; and transmitting said event messages to an event handler for processing.

In accordance with a yet further aspect of the invention there is provided a method of generating billing records for participation in a service session, in which a plurality of participants participate, provided by a telecommunications system, said method comprising:

receiving event messages indicating discrete changes in the status of individual participants in said service session; and generating a plurality of billing records each containing data indicating a charge for a different individual participant's participation in said service session, wherein a billing record indicating a charge for a particular participant's participation in said service session includes data derived from discrete changes in the status of other participants in said service session, such that the charge indicated for said particular participant is dependent on a change in status of said other participants during said service session.

By allowing the changes in status of other participants to affect a charge to be made for participation by a particular participant, novel and utile tariffing structures may be implemented for multi-party services.

BRIEF DESCRIPTION OF DRAWINGS

Embodiments of the present invention will now be described, by way of example only, with reference to the accompanying drawings wherein.

DETAILED DESCRIPTION OF EXEMPLARY EMBODIMENTS

Figure 1:
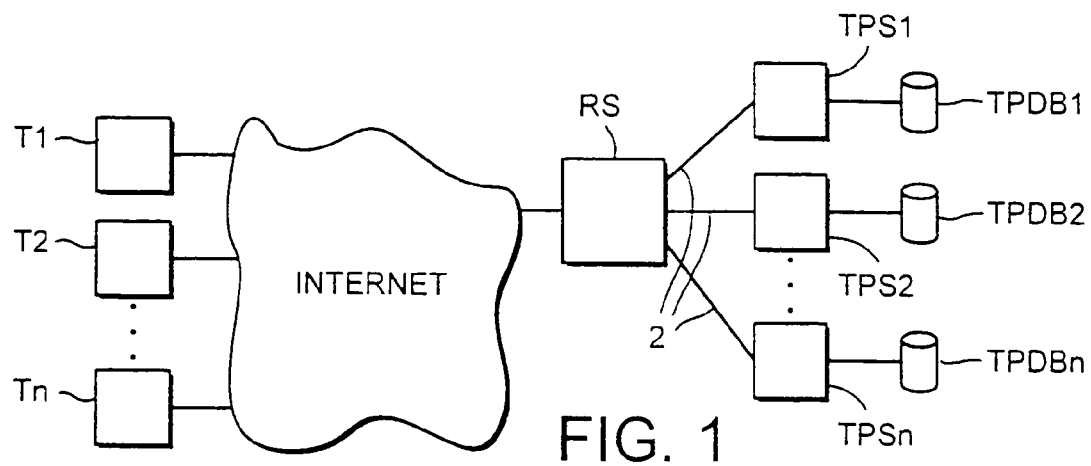
FIG. 1 is a schematic block diagram of a telecommunications system in accordance with an embodiment of the present invention.

FIG. 1 is a block diagram illustrating a telecommunications system in accordance with an embodiment of the present invention. The system consists of a retailer server RS and a plurality of third party servers TPS1, TPS2 . . . TPSn. User terminals T1, T2 . . . Tn are connected to the retailer server RS via a data communications network, in this embodiment the Internet.

The third party servers TPS1, TPS2 . . . TPSn are either remotely connected to the retailer server RS via communication links 2, which may be separate physical links and/or logical links, as shown, or are co-located with the retailer server RS.

Each third party server has access to a database TPDB1, TPDB2 . . . TPDBn for the storage and retrieval of service-related data.

Although the servers RS TPS1, TPS2 . . . TPSn are illustrated in FIG. 1 as consisting of single servers, each may consist of one or more servers interconnected in a network. The servers may each be implemented on a computing resource, such as a workstation computer. Each of the user terminals T1, T2 . . . Tn may be implemented in the form of a workstation computer, a net computer, a mobile communications terminal, etc.

Figure 2:
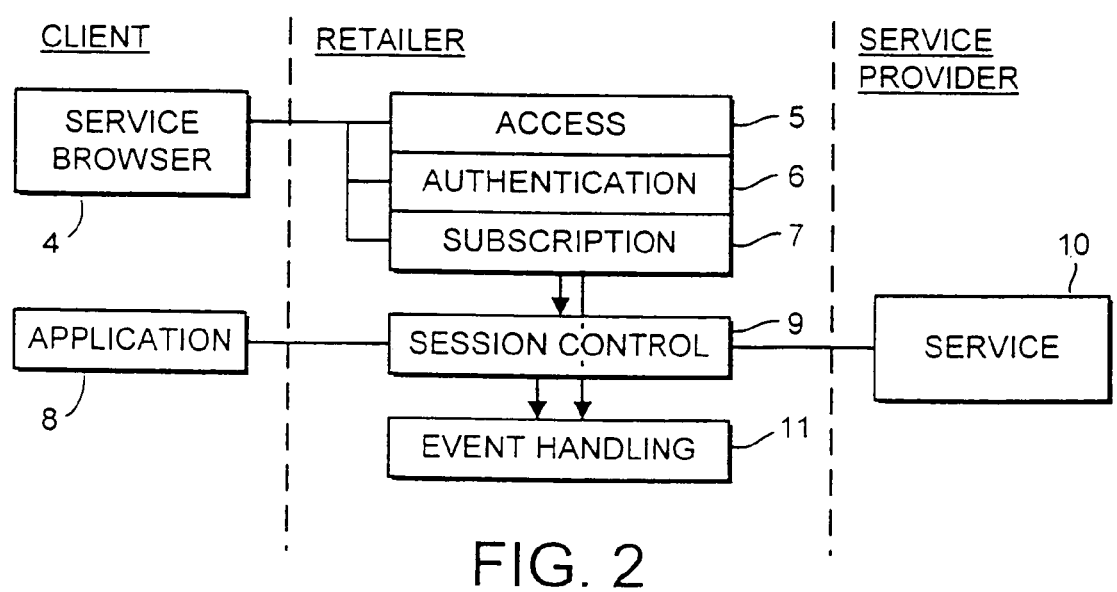
FIG. 2 is a schematic block diagram of system components in the client, retailer and service provider domains of the system illustrated in FIG. 1.

FIG. 2 schematically illustrates further details of the telecommunications system, exemplifying components present in a single user terminal, the retailer server and a single third party server. On the client side, a service browser application program 4 provides access and support to a range of services provided by the various third party servers TPS1, TPS2 . . . TPSn via the retailer server RS. The retailer server RS includes an access control part 5, whereby a client terminal may initially access the service provision system, an authentication part 6 whereby users of the system may be authenticated such as by means of a password checking procedure, and a subscription part 7 which maintains subscription data for users of the system.

During participation in a service the client terminals, the retailer server and the third party server include application program parts, including on the client side, a service-specific application program part 8, on the retailer side, a session control application program part 9 and on the service provider side, a service control application program part 10.

The retailer server, or server network, also includes an event handler 11 which handles events generated by the session control application part 9 during a service session.

It is to be understood that the separation into retailer and service provider domains illustrated in FIG. 2 is not necessarily a physical division, or a division of ownership or control between different servers. For example, the service provider service control part 10 may be held on a server controlled by the retailer, such as that holding the retailer server RS itself.

Figure 3:
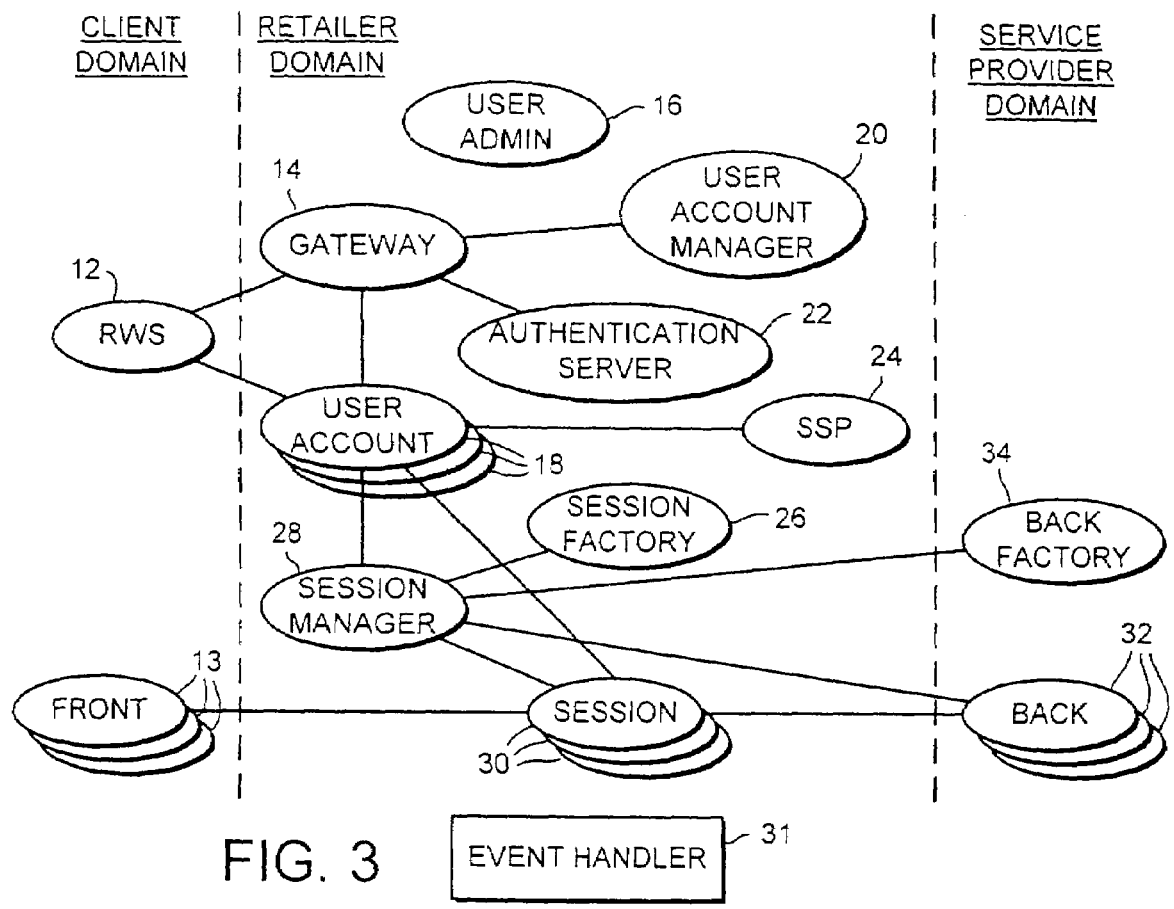
FIG. 3 is a schematic block diagram illustrating an embodiment of the arrangement illustrated in FIGS. 1 and 2, consisting of interrelated software objects.

FIG. 3 illustrates an embodiment of the invention in which the system is implemented as a software object system. A description of object-oriented software concepts may be found in "Design Patterns: Elements of Reusable Object-Oriented Software", Erich Gamma et al., Addison-Wesley, ISBN 0-201-63361-2, and the bibliography references given therein.

In this embodiment, each of the computing elements T1, T2 . . . Tn; RS; TPS1, TPS2 . . . TPSn illustrated in FIG. 1 is supported by a distributed processing environment (DPE), whereby distributed software objects in different physical parts of the system may interact by the passing of messages, for example using CORBA (Common Object Request Broker Architecture) mechanisms, via data communications links.

In the following, reference will be made to the object-oriented language Java (trade mark), which is not intended to be limiting. Other, and indeed heterogeneous mixtures of object-oriented languages may also be used to implement the system.

The distributed object system includes service generic code and service specific code, which is distributed between the client side and the server side during a service session. The part of the system including service generic code is referred to herein as the service provision support system.

Service specific code in the client domain is referred to herein as a "front" object. The front object in this embodiment is a Java applet which runs on the client machine. The front object 13 communicates with other system objects, to support and control a user's participation in a session. The front object 13 also provides the service specific front end functionality, such as the service GUI and handling user input relating to the service.

Service specific code in the service provider domain is referred to herein as a "back" object. The back object 32 represents the session and its participants within the service provider domain and may interact with other back end systems, such as servers and databases in the service provider domain. It co-ordinates the interaction between participants in a session and stores service specific state while a participant is suspended. The back object 32 can also exert control over a session, for example it can initiate suspend and exit for one or more participants. A possible implementation of the back object 32, in which objects control the service session and the service provided to individual participants in the service session, is described in our copending International patent application, filed on even date herewith and entitled "Multiple Service Provision" (agent's reference J40600), the contents of which are incorporated herein by reference.

Client Domain Software Objects

A retail workspace object (RWS) 12 runs on the client machine and provides the client with a means of accessing services.

The RWS 12 may be a downloadable Java applet which runs in a known Java-enabled browser, or a stand-alone Java application program. The RWS allows the user to log on to the service session control system, to access service sessions by downloading front objects 13 and to log off via a GUI.

The RWS 12 is multi-threaded to allow front objects 13 to be used in parallel, both with each other and with the RWS 12. For example, a user may participate in two services simultaneously and at the same time receive, via the RWS 12, an invitation to join a third service. Thus, a user may have multiple front objects 13 of the same or different services running simultaneously on the client terminal.

When the user exits or suspends a session the front object 13 is destroyed.

Retailer Domain Software Objects

A gateway object 14 provides an initial point of contact for user access to the system. It mediates the authentication of the user's identity and password with the RWS 12. Thereafter, the RWS 12 connects to a user account object 18 and the gateway plays no further part.

The gateway 14 is multi-threaded to ensure availability. That is to say, during the processing of a logon request received from one client terminal, the gateway 14 is able to process logon requests arriving from, different client terminals.

A user administration object 16 provides functionality to create new user accounts.

The user account object 18 serves as a single user's account within the 010 retailer domain. It holds or obtains a record of all the services to which the user is subscribed. The user account 18 also receives and stores, or obtains as needed, information from other objects in the retailer domain about any suspended sessions the user may have, all public sessions available and any session invitations the user may have received.

The user account object 18 also mediates interactions between the RWS 12 and the remainder of the retailer domain to start, join and resume sessions. It handles notifications from a session object 30 that sessions have been suspended or ended.

User account objects are present in the retailer domain even when the users which they represent are logged off the system.

A user account manager object 20 creates and maintains the user account objects 18 and provides a reference to the appropriate user account object 18 when a user logs on to the system to start a communications session with the retailer server RS.

An authentication server object 22 uses stored user authentication data to authenticate log on requests.

A service provider portfolio object (SPP) 24 maintains information on available services, including the service provider identities and their network addresses, and which session manager 28 is to be used to support a service (this allows loads to be managed across a plurality of session managers 28).

A session manager object 28 prompts a session factory object 26, and a back factory object 34 (which is in the service provider domain) to instantiate session objects 30 and back objects 32 to support service sessions and then mediates between the user accounts 18, the session objects 30 and the back objects 32 to support further service interactions (e.g. invite, join, suspend, resume). There is one or more session manager objects 28 in the system.

The session object 30 is a service generic object (i.e. an object used in multiple different types of services) which controls a service session and co-ordinates the interaction of the objects involved in that session. It handles generic session behaviour such as invitations and suspensions. For example, when a client front 13 suspends a user's session, the session object 30 responds by calls on the user account 18 and the custom back 32 and by transmitting an event message to the event handler 31.

There is a single session object 30 instantiated per service session being controlled by the system. The session object 30 is created when the first participant starts the session and is destroyed when the last participant exits the session. The session object 30 is otherwise not destroyed, even if all its participants are suspended.

An event handler 31 is arranged to receive event messages generated by other objects in the retailer domain, in particular the user accounts 18 and the session objects 30.

Service Provider Domain Software Objects

The back factory 34 instantiates back objects 32 at the initiation of the session manager 28.

There is a single back object 32 per session object 30. Each back object 32 exists only as long as the session object 30 handling the same service session exists.

It should be mentioned that objects in the service provision support system, in particular the gateway 14, the user account manager 20, the authentication server 22 and the service provider portfolio 24 may consist of multiple federated copies forming a single logical object, in order to provide scalability of the system.

Figure 4:
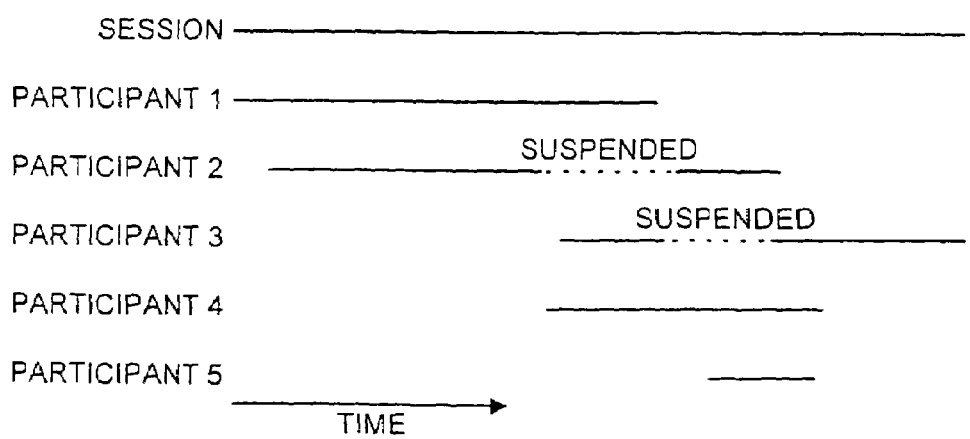
FIG. 4 is a diagram schematically illustrating a session lifecycle in accordance with an embodiment of the present invention.

FIG. 4 illustrates an example of a session lifecycle. The session is begun when a first participant (participant 1) starts the session. Throughout the lifetime of the session, various numbers of participants may join the session, suspend, and exit the session. The session exists until the last participant (in the example shown, participant 3) exits the session, when the session terminates.

FIGS. 5 to 13 illustrate interactions between objects in the system during changes in the session-related status of a user of the system. Messages sent between objects are indicated by solid arrows, and are numbered to indicate the sequence in which the messages are sent. Event channels (indicated by dotted solid arrows) are used in various cases by the session object 30. Messages are sent by event channels to avoid blocking the session object 30, as would occur if request-response procedures were used, and which would impact on the service to other participants.

Several of the interactions between the RWS 12 and the user account 18 identify particular session instances. Passing direct references to the session objects 30 to the RWS 12 may compromise security. To avoid this, the sessions are identified by the RWS 12 using stored "cookie" references, previously passed to it by the user account 18, whereby the user account 18 is able to identify the actual session object 30 being referred to.

For clarity, the objects not involved in the interactions being described are omitted from FIGS. 5 to 13.

Figure 5:
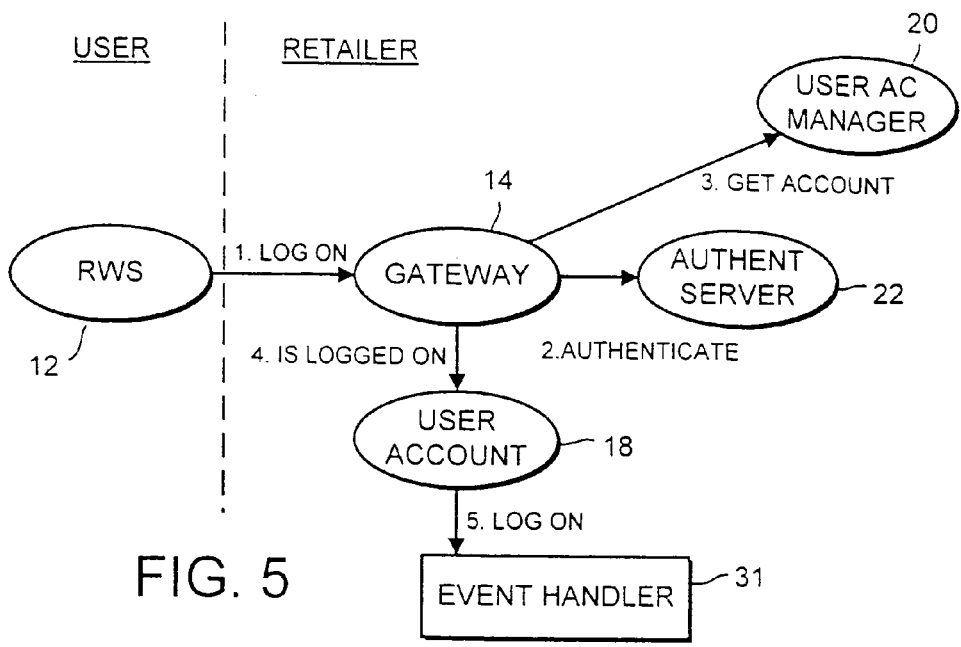
FIGS. 5 to 13 illustrate interactions between the objects illustrated in FIG. 3 during various procedures causing a change in the status of a user of the system.

Referring to FIG. 5, the gateway 14 is the initial point of contact for user access to the system. The RWS 12 initiates a data communications session with the gateway and sends a logon message with the user name and password supplied by the user. Provided these values are authenticated by the authentication server 22, the gateway 14 then retrieves a reference to the user's user account from the user account manager 20 and then contacts the appropriate user account 18 to confirm that the user is now logged on. The user account 18 transmits a message to the event handler 31 informing it of the logon event.

Further interaction then takes place between the RWS 12 and the user account 18 where the user account 18 returns user profile information including subscribed services, suspended sessions, public sessions and invitations received, access to which information the RWS 12 then makes available to the user via the client terminal.

Figure 6:
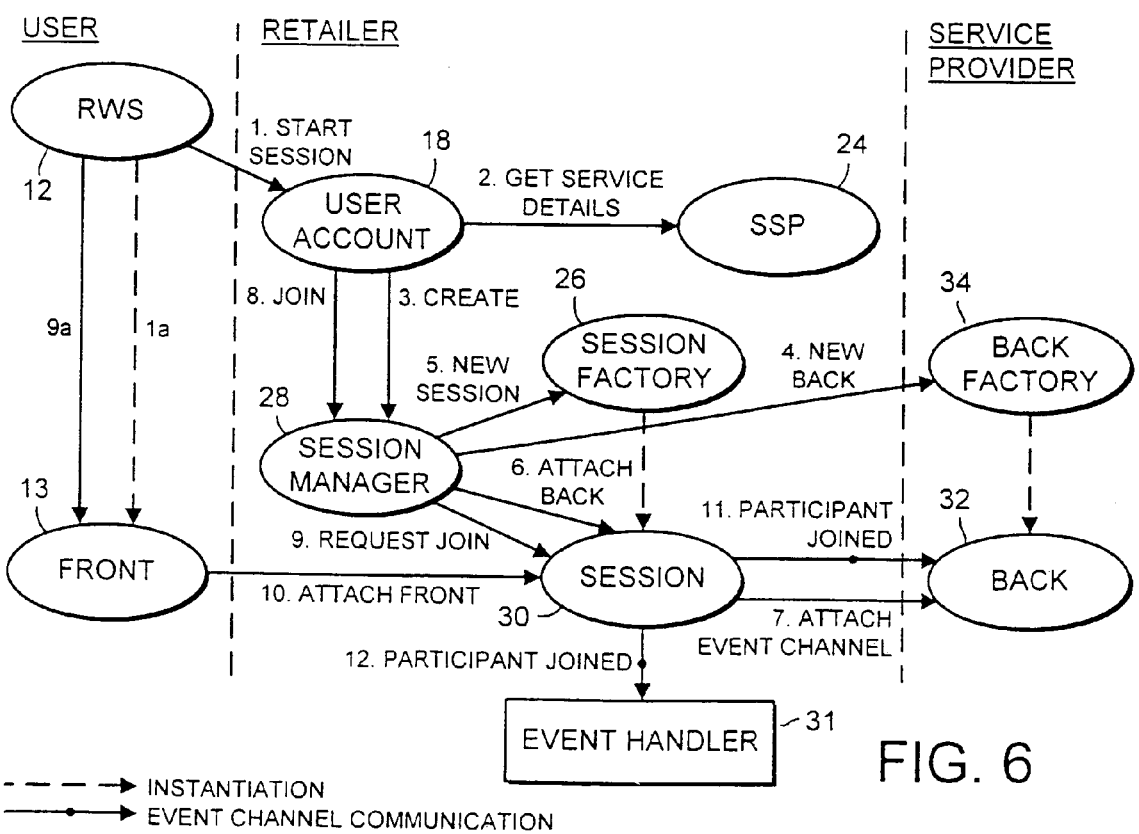

Referring to FIG. 6, when the user initiates a session via the client terminal, the RWS 12 sends a session starting message to the user account 18 specifying the service requested. In order to create a front object 13, the RWS 12 spawns a thread to download the appropriate front object, and downloads the appropriate front object 13 for the service from the retailer server RS.

The user account 18 obtains details for the service requested from the SPP 24, including the identity of the session manager 28 to support the service session, and sends a message to the session manager 28 to create a new session.

The session manager 28 sends a message to the back factory 34 to instantiate a new back object 32 and sends a message to the session factory 26 to instantiate a new session object 30. The back factory 34 and the session factory 26 return references to the new back object 32 and session object 30 respectively, which are then used by the session manager 28 to instruct the new session object 30 to attach to the new back object 32. The session object's reference is also passed back to the front 13 subsequently via the RWS 12 to allow the front object 13 to attach to the session object 30.

The user account 18 then sends a join-service message to the session manager 28 which in turn sends a request-join message to the created session object 30 to cause the user to join a session.

Finally, the RWS 12 instructs the front object 13 to send an attach message to the session 30. This establishes the communications channel between the front object 13 and the session object 30. The session object 30 then sends a participant-joined message to the back object 32. The session object 30 also transmits a message to the event handler 31 to inform it of the start session event.

Figure 7:
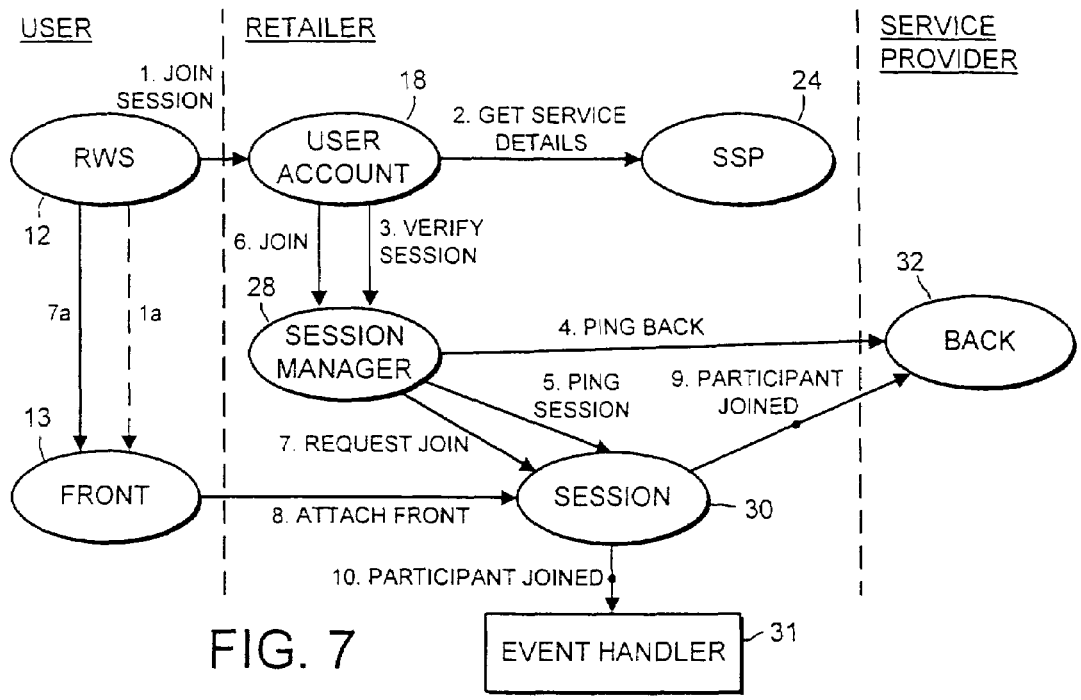

Referring to FIG. 7, a user can join a session to which he has received an invitation. The RWS 12 transmits a joined-session message to the user account object 18, which passes a "cookie" reference to indicate which invite the user wishes to accept. The user account 18 obtains details of the service from the SPP 24 and sends a message to the session manager 28 to verify that the session is still current. The session manager 28 pings the session object 30 and the custom back 32 to confirm this. Meanwhile, the RWS 12 spawns a thread to download the appropriate front object 13 for the selected service.

Once the session is verified by the session manager 28, the user account object 18 sends a join message to the session manager 28, which results in a request-join message sent by the session manager 28 to the appropriate session object 30. If the join request succeeds, the RWS 12 sends a message to instruct the front object 13 to attach to the session object 30, identified by the reference transmitted by the user account 18. The session object 30 then sends a participant-joined message to the custom back 32, by event channel. The session object 30 also transmits a message to the event handler 31 to inform it of the session joining event.

Figure 8:
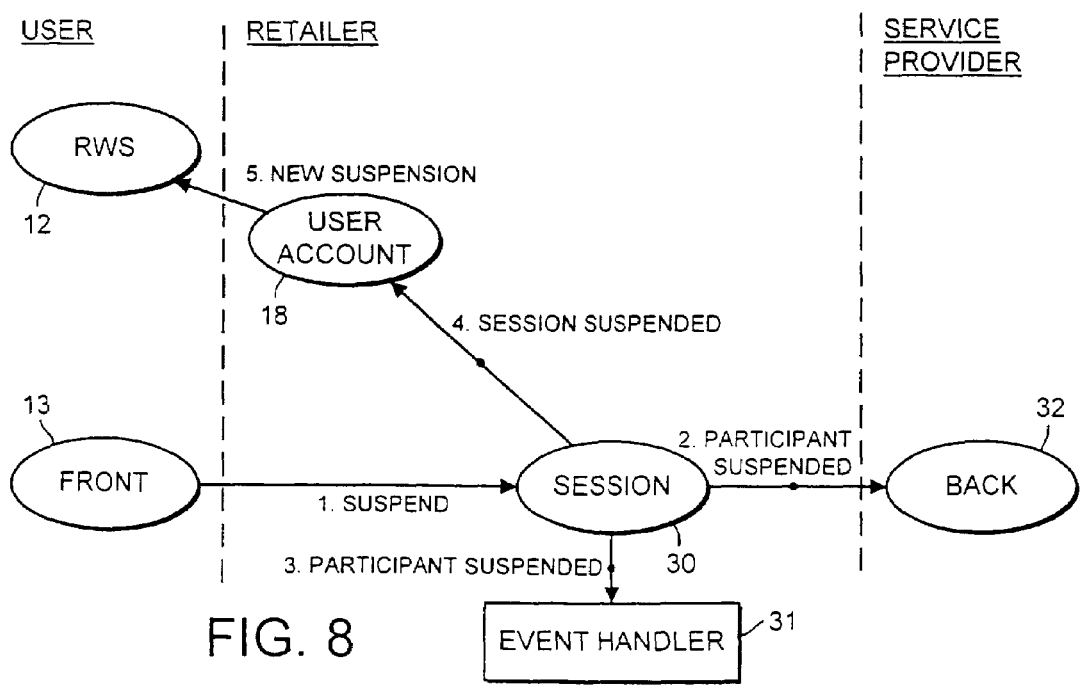

Referring to FIG. 8, the suspension of a user from a session can be initiated by the front object 13 sending a suspend message to the session object 30. The front object 13 then destroys itself. The session object 30 sends a participant-suspended message to the back object 32, by event channel, and marks the participant in question as suspended. The session object 30 also sends a message to the user account 18 to notify it of the user's new status, and transmits a message to the event handler to inform it of the suspension event.

Finally, the user account 18 sends a message to inform the RWS 12 of the new suspension, passing a cookie reference to the session 30, so that the user is able to resume the session thereafter.

Figure 9:
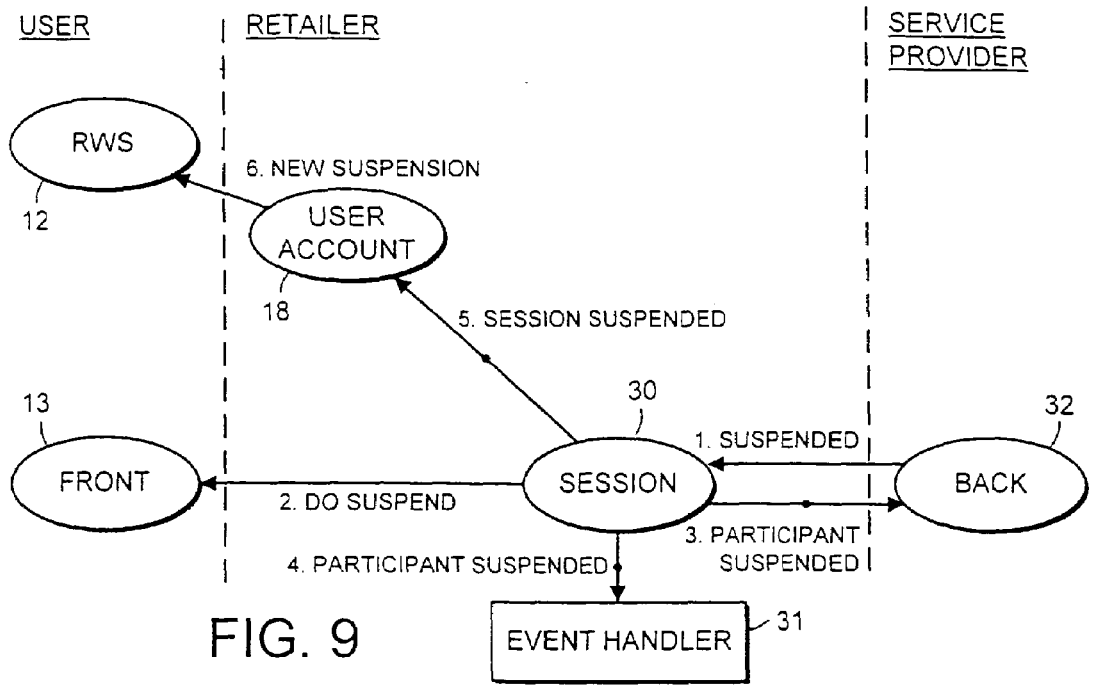

Referring to FIG. 9, an alternative session suspension procedure can be initiated from the custom back 32. In this case, suspension is initiated by the custom back 32 sending a suspend message to the session object 30. The session object 30 sends a suspend message to the front object 13 in question, which then destroys itself. The session object 30 proceeds by sending a participant-suspended message to the back object 32, and transmitting a message to the event handler 31 informing it of the suspension event. The process continues as described in relation to FIG. 8.

Figure 10:
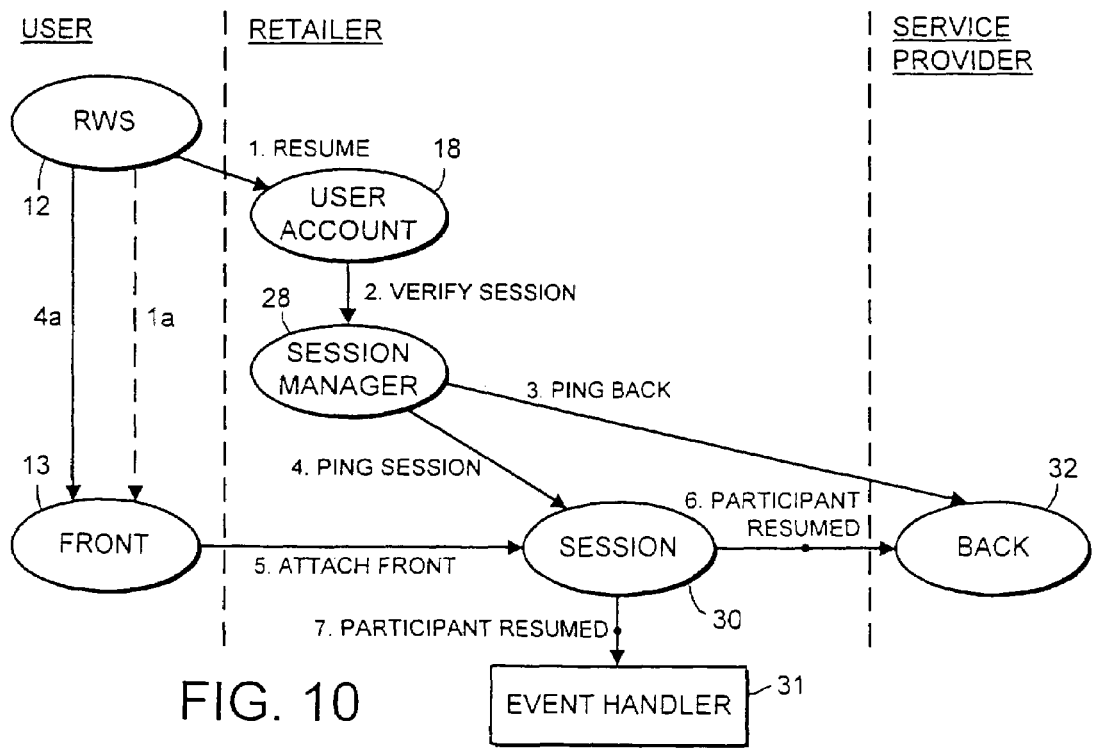

Referring to FIG. 10, the RWS 12 is made aware of all suspended sessions for the user by the user account 18 immediately when the user is logged on, and throughout an access session. Therefore, when a user elects to resume a session, the RWS 12 sends a resume message to the user account 18, which indicates the session to be resumed, by means of a cookie reference. The user account 18 sends a verify-session message to the appropriate session manager 28, which pings the session object 30 and back object 32 to verify that the session is still in progress.

Meanwhile, the RWS 12 downloads the appropriate front object 13 for the selected service. Once the session manager 28 has verified that the session remains available, the RWS 12 instructs the front object 13 to send an attach-front message to the session object 30 to restore the front connection with the session object 30. The session object 30 then sends a participant-resumed message to the back object 32, by event channel. The session object 30 also transmits a message to the event handler 31 to inform it of the resumption event.

By providing for suspension of a participation in a service session as described, in addition to complete exiting from a service session, the state of the participation may be stored in the back object 32 for the duration of the suspension, and recovered when the participant opts to resume participation. Destruction of the of the front object 13 on suspension allows for efficient management of the client terminal resources, as a new front object 13 may be readily downloaded on resumption.

Figure 11:
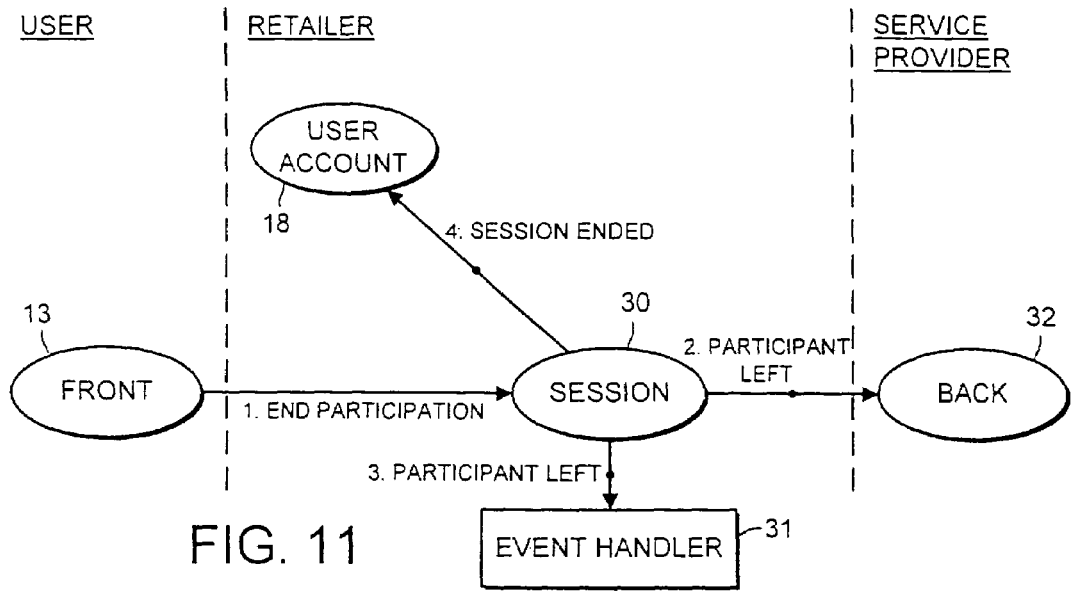

Referring to FIG. 11, when a user wishes to exit a session, the front 13 sends an end-participation message to the session object 30, and then destroys itself. The session object 30 sends a participant-left message to the back object 32. The session object 30 also transmits a message to the event handler 31 to inform it of the participant leaving event. The session object 30 then sends a session message to the user account 18 to notify it that the user has left the session. The session object 30 then destroys itself if there are no active or suspended participants left in the session, after sending a message to the event handler 31 to inform it of the session ending event.

Figure 12:
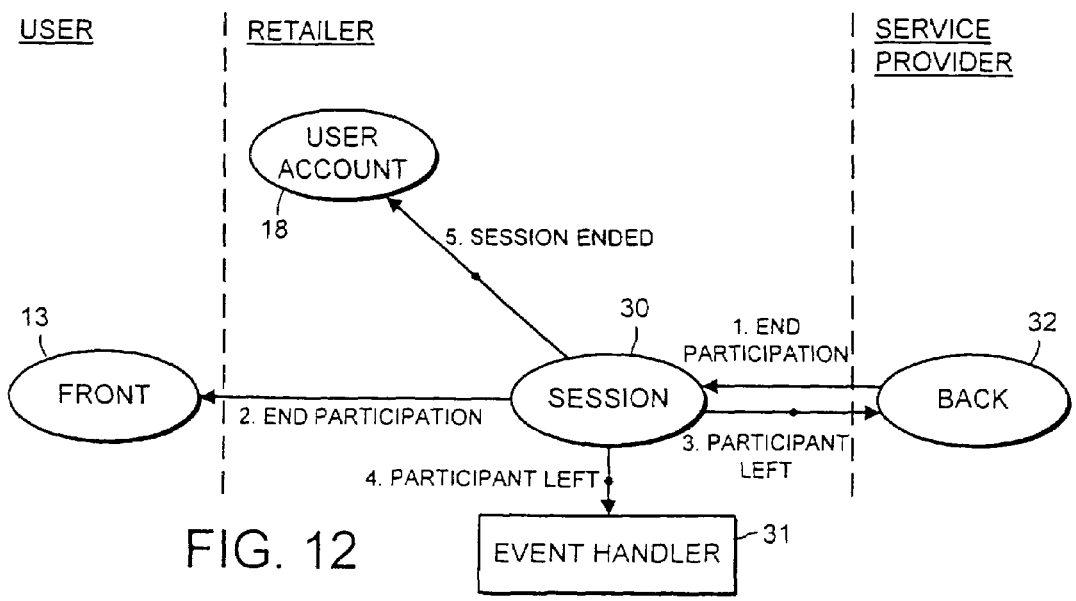

Exiting the session may alternatively be initiated, as a result of service logic processing, from the back object 32 as illustrated in FIG. 12. In this case, exit is initiated by the back object 32 sending an end-participation message to the session object 30. The session object 30 sends an end-participation message to the front object 13, which then destroys itself. The session object 30 then sends a participant-left message to the back 32, and to the event handler 31. The process then continues as described in relation to FIG. 11.

Figure 13:
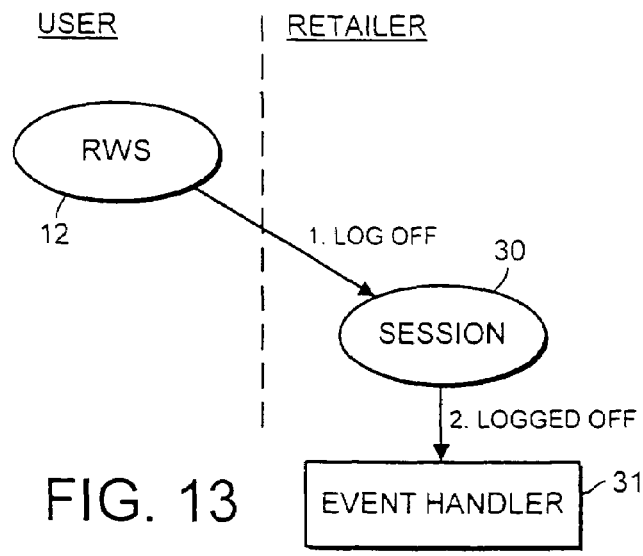

Referring to FIG. 13, when the user logs off, the RWS 12 sends a logoff message to the user account 18. The user account 18 transmits a message to the event handler 18 to inform it of the logoff event.

Other than the front 13 and the custom back 32, all of the objects illustrated in FIGS. 5 to 13 are generic to different services supported in the system, and are thus re-used for the provision of multiple different types of services.

A service session consists of a single custom back 32, deployed within the service provider domain, together with a number of front objects 13. One front object 13 is present per participation in the service. The front objects 13 may be distributed in several client terminals, and/or within a single client terminal. The interactions between the front object 13 and the back object 32 are mediated by the remainder of the system.

Thus, a service developer need not be concerned when developing a particular service with implementing the multi-party session control functions which are provided by the system. These functions include the generation of event messages which allow the service-specific pricing of the service provided to each user and service-specific costing of the service provided by the service provider to the retailer. All that the service provider needs to develop to implement a service, which nevertheless may be individually priced and costed, is the code for the service provision functionality in the service specific front object 13 and the code for the service provision functionality in the service specific back object 32.

The event notifications made by the session object 30 to the event handler in FIGS. 5 to 13 are examples only of the possible event messages. A more complete list of session-related events which may be notified by the session object 30 is as follows:

i) a user starting a service session, ii) a participant joining an existing service session, iii) a participant suspending participation in an existing service session, iv) a participant resuming participation in an existing service session, v) a participant leaving a service session, vi) a participant inviting another user of the system to join a service session, vii) a participant advertising a service session generally to users of the system inviting those users to join a service session, viii) a user of the system declining an invitation to join a service session, ix) a participant withdrawing a general advertisement to users of the system inviting those users to join a service session, x) a service session ending.

It is a characteristic of the event messages transmitted to the event handler 31 that the events detailed in the event messages contain no history data. In other words, the events are not logically combined, and each message concerns only an instantaneous event which has just occurred in the session. This is to be compared with other known ways of generating events, which generally include calculating a duration, by referring to historical usage start date/time on receiving a usage stop date/time. By the events transmitted to the event handler not being logically combined, the flexibility of processing which may be subsequently applied to the events is maintained at a high level.

Each event message contains the following data:

1. A session ID.

2. The name of the service (or an identifier) being supplied during the session.

3. A category of the event (for example, session-related, participant-related, service-provider defined, invitation, or other category of event).

4. The event type (for example, start, stop, joined . . . ).

5. A date/time stamp.

6. A participant ID, which is unique in the context of the session.

7. The user name of the participant.

8. The identity of the party to be billed, which is constant for a particular participant throughout a session.

In the event categories referred to above, one event category is referred to as a service provider defined category. Discussions thus far have related to events automatically generated by the service provision support system. In order to provide further flexibility, a third party service provider may include a service-specific billing event to be generated at an appropriate point during a server session. Such service provider defined events are initiated in the service control component, in the service provider domain, and passed to the event handler in the same manner as the service-generic session events previously referred to.

Figure 14:
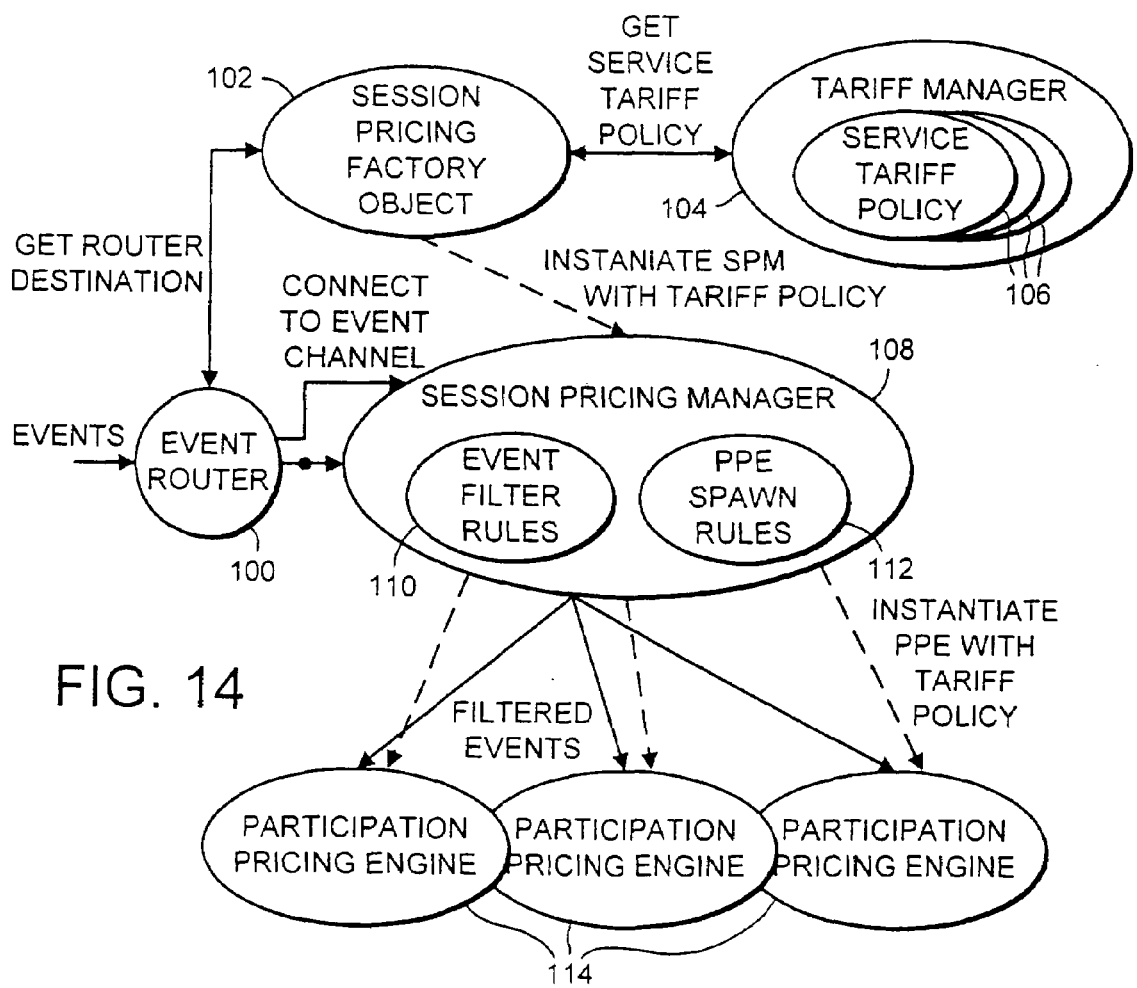
FIG. 14 is a schematic block diagram illustrating software objects interactions in an event pricing engine in accordance with an embodiment of the present invention.

FIG. 14 illustrates one embodiment of the event handler 31, which performs pricing of service usage on a per-session basis.

Event messages enter the event handler at an event router object 100. On receiving an event message indicating the start of a new service session, the event router generates a message which is sent to a session pricing factory object 102, including the identity of the session. The session pricing factory object 102 proceeds to retrieve a service tariff policy object 106 from a tariff manager object 104.

The service tariff policy request sent by the session pricing factory object includes the identity of the service to which the session pertains, and the service tariff policy returned by the tariff manager is service-specific.

One or more service tariff policy may be held by the tariff manager for each service provided by the entire service provision support system. In the case of more than one service tariff policy being held for a service, one such policy is selected depending on input parameters, such as the date/time of the start of the session, the billing status of the first participant in the session, etc.

A service tariff policy could also be shared between different services which are to be priced in the same manner.

The service tariff policies include data specifying how events are to be logically combined and/or filtered in order to price a participation in a session.

On receipt of the service tariff policy 106 from the tariff manager 104, the session pricing factory object 102 instantiates a session pricing manager object 108, which includes event filter rules data 110 and participation pricing engine spawn rules data 112, derived from the service tariff policy which is particular to the service the session pricing manager is to handle.

A service session is started by a single participation, for which the session pricing manager spawns a single participation pricing engine object 114. The participation pricing engine 114 contains pricing rules derived from the service tariff policy originally received from the tariff manager.

On instantiating the session pricing manager 108, the session pricing factory object 102 returns a destination address for the session pricing manager 108 to the event router 100. On receiving the session pricing manager address, the event router 100 transmits a message to the session pricing manager instructing it to connect to an event channel whereby the event messages received by the event router pertaining to the session handled by the session pricing manager are passed to the session pricing manager.

The event router itself receives event messages pertaining to a number of different sessions ongoing in the service provision support system, and routes the events to the various corresponding session pricing managers.

As will be appreciated from the above, the session pricing manager 108 receives event messages originating from a service session which informs the session pricing manager of a predetermined set of session-related events, if and when they occur in a service session.

As the session manager receives event messages indicating new participants joining a session, it spawns additional participation pricing engines.

The session pricing manager 108 applies event filter rules to discard events which are, for the service in question, not determinative of price. The session pricing manager copies each of the filtered events to a plurality of participating pricing engines 114, to be logically combined in accordance with a defined charging algorithm to produce calculated price data for each participation in the session. The price data calculated and summary event information is then transmitted to a billing system log, to allow the charge to be debited against an account of the responsible party for each participation.

As will be appreciated, this arrangement allows the actions of not only the participant for which a participation is being priced to be taken into account in the pricing algorithm used, but also allows the actions, or changes in status, of other participants within the service session to be taken into account in the operation of the charging algorithm of the participation in question.

On receipt of a message indicating that the session has ended, the service pricing manager copies the message to each participation pricing engine and then destroys itself. Each participation pricing engine generates a record of the pricing data generated as a result of the events occurring within the session and relating to the participant which the participation pricing engine is responsible for, and transmits the pricing data to a billing log to be debited against the billed party account. Each participation pricing engine then destroys itself.

To exemplify a charging policy which may be used for an example service, for a conferencing service the system might charge the organiser of a conference session an entry fee of N for each participant in the session, and each participant is individually charged a usage fee of n per unit time.

An example session in this case may include participant 1, having a first user status, such as that of the organiser of this session, starting the session and inviting participants 2 and 3 to join the session at a second user status, such as that of normal participants. Participants 2 and 3 accept the invite. Participant 2 subsequently suspends. Participant 3 leaves the session. Participant 2 resumes and subsequently leaves the session, along with participant 1.

In this example scenario, the participation pricing engine acting on behalf of the conference organiser (participant 1) receives event messages informing it of other users joining the session, in the example given participants 2 and 3 joining. The entry fee is then charged three times by the participation pricing engine acting for participant 1. The participation pricing engines pricing the usage of participants 2 and 3 receives event messages including messages specifying when the party they are responsible for joins, suspends, resumes and leaves, and calculate a time-based charge accordingly.

To give a further example, a service in the form of a game may be charged at a fee of X per unit time, divided by the number of participants involved at any particular time, per participation.

In this example, three participants play the game. Participant 1 starts the session and invites participants 2 and 3, which then join the session. After a certain time, participant 1 leaves the session. Later, participants 2 and 3 leave.

In this example scenario, the participation pricing engine acting on behalf of participant 1 requires knowledge of the session-related status of each participant in the session, due to the charging policy adopted. When participants 1, 2 and 3 are active in the session, each participant is charged X/3 per unit time. When participant 1 leaves the session, participants 2 and 3 are charged X/2 per unit time, due to the reduced number of participants involved.

As will be appreciated from the two scenarios described above, the automatic generation of a comprehensive set of event messages which may be filtered and copied to individual participation pricing engines provides the ability to adopt charging policies for a service which are flexible and individually configurable, without requiring the service session logic, nor indeed the service logic itself, to have knowledge of the charging policies which will be adopted for the service. Furthermore, charging policies may be dynamically altered with time readily. All that is required in order to alter the charging policies for a particular service is to provide a new service tariff policy held in the tariff manager for the service in question.

In addition, each individual participation pricing engine may be configured on a user-dependent basis. Namely, user subscription data may be used to provide for user-specific pricing of participations in the session. This may include volume discounts, etc, to be applied to the pricing policies adopted by each participation pricing engine. In addition, the participation pricing engines may be configured in dependence on the role played by a participant in a session. For an example, a user may adopt an active/player or passive/viewer role in a session. The price charged for the participation may vary depending on the role played. In order to take such roles into account, the session pricing manager, on detecting a new participant joining a session, applies the PPE spawn rules data 112 in order to instantiate a participation pricing engine 114 in accordance not only with the service tariff policy, but also with the appropriate participation type characteristics.

Figure 15:
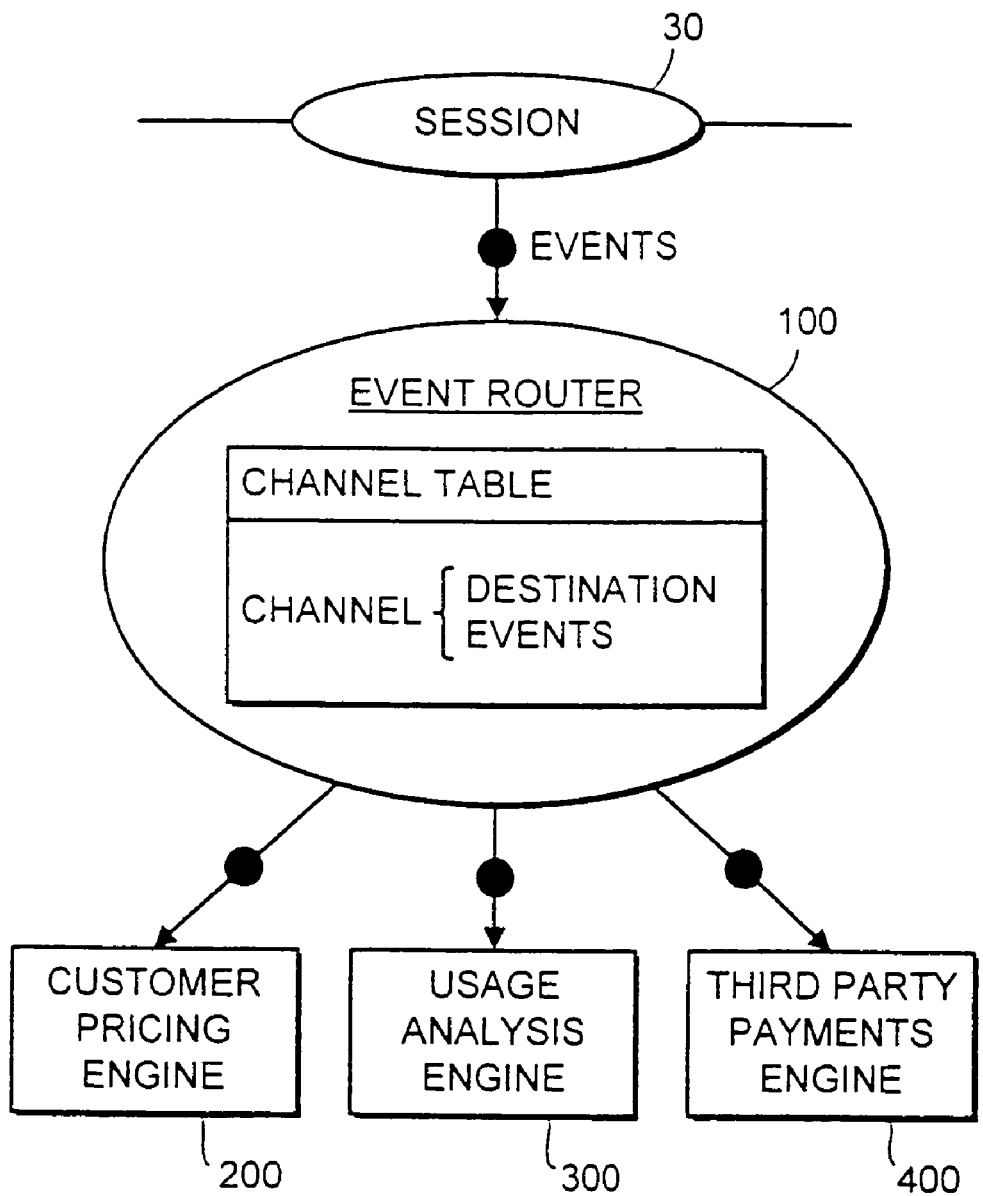
FIG. 15 is a schematic block diagram illustrating the handling of events by an event router in accordance with an embodiment of the present invention.

FIG. 15 illustrates a further embodiment of the invention, in which the event router 100 copies event messages originating from a single session object 30 for dissemination to different parts of the event handling system which are responsible for different aspects of event handling. In the embodiment shown, these different parts include a customer pricing engine 200, which may be similar to that described in relation to FIG. 14, a usage analysis engine 300, and a third party costing engine 400.

The event router 100 holds a channel allocation table which provides a register for determining the destination of events received from various different session objects, by quick reference.

The customer pricing engine 200 applies event filter rules and tariff policies to the events occurring during a session in order to generate billing records for each individual participant in the session.

The usage analysis engine 300 stores the event data passed to it for large numbers of service sessions, so as to build up a statistically significant view of the usage of services in the system. The usage analysis engine may then produce statistically-processed data for use in monitoring and improving the quality and range of services provided by the system.

The third party costing engine 400 receives the events originating from the session object 30, and filters and logically combines the events occurring during a session in accordance with third party costing policies adopted for the service in question, in order to provide a method of calculating payments to be made by the service retailer to the service providers.

As will be understood from FIG. 15, the provision of a predetermined set of events which are automatically generated by the service provision support system is such as to allow flexible customer pricing policies to be generated directly from the messages received at a customer pricing engine. Furthermore, other processors may make use of the same event messages, or a copy thereof.

What is claimed is:

1. A communications system comprising a plurality of client side and server side computing elements, each computing element supported by a distributed processing environment whereby distributed software objects in different physical parts of the system interact by passing messages via data communications links, the communications system including service generic code and service specific code, which is distributed between said plurality of computing elements during a service session, wherein the service generic code supports a plurality of differing types of service during a service session, said service generic code when in use comprising:

a session manager which performs functions generic to said plurality of differing types of service during service sessions;

for each type of said differing types of service, said session manager is arranged during a service session in which a plurality of participants participate, to generate a separate event message in response to each discrete change of a session-related status of an individual one of the plurality of participants in the session, the discrete changes in the session-related status of each of the individual participants including each individual participant joining the session and that same individual participant leaving the session, separate event messages respectively indicating the joining and leaving of the session of that same individual participant, wherein a service-session event handler receives logically uncombined events transmitted in the separate event messages respectively generated in response to each change in the session-related status of said plurality of participants without any historical data; and the service session event handler determines respective charges for each particular participant's participation in the session based on that participant's discrete changes in status including that individual participant's joining and leaving the session as well as each of the other participant's changes in status including each of the other participant's joining and leaving the session.

2. The communications system as in claim 1, wherein the computing elements include:

a retailer server;

a plurality of third party servers, each third party server being arranged to have access to a data base for the storage and retrieval of service related data; and a plurality of user terminals connected to the retailer server via a data communications network.

3. The communications system as in claim 2, wherein the third party servers are connected remotely to the retailer server via communications links.

4. The communications system as in claim 2, wherein the third party servers are co-located with the retailer server.

5. The communications system as in claim 2, wherein the retailer server comprises one or more servers interconnected in a network.

6. The communications system as in claim 2, wherein at least one of said plurality of third party servers comprises a plurality of servers interconnected in a network.

7. The communications system as in claim 2, wherein at least one of the user terminals comprises a mobile communications terminal.

8. The communications system as in claim 1, wherein said service-session event handler comprises a pricing data processor for determining said charges.

9. The communications system as in claim 8, wherein said pricing data processor is arranged to perform service-specific processing of said event messages.

10. The communications system as claimed in claim 1, wherein said service-session event handler comprises a service usage monitor for storing and/or analyzing usage of said services over statistically significant numbers of service sessions.

11. The communications system as claimed in claim 1, wherein said service-session event handler comprises a cost data processor for costing a service provided by a third party during a service session.

12. The communications system as claimed in claim 1, wherein said service-session event handler comprises an event message multiplier for copying said event messages and distributing said copied messages to a plurality of event processors.

13. In a telecommunications system, an apparatus arranged to generate billing records for participation in a service session, in which a plurality of participants participate, provided by the telecommunications system, said apparatus comprising:

means to receive logically uncombined events transmitted in respective separate event messages indicating respective discrete changes in the session-related status of individual participants in said service session without any historical data, the discrete changes in the session-related status of each of the individual participants including each individual participant joining the session and that same individual participant leaving the session, separate event messages respectively indicating the joining and leaving of the session of that same individual participant; and means to generate a plurality of billing records each containing data indicating a charge for a different individual participant's participation in said service session, wherein a billing record indicating a charge for a particular participant's participation in said service session includes data derived from logically uncombined events transmitted in respective separate event messages indicating respective discrete changes in the session-related status of each of the individual participants' joining and leaving the session indicated in separate messages as well as respective separate messages indicating the respective discrete changes in the session-related status of at least one other participant's joining and leaving of the session such that charge indicated for each of the individual participants is dependent on the status of that same individual participant and the status of the at least one other participant.

14. The apparatus according to claim 13, wherein the charge indicated for said particular participant is dependent on the number of other participants in said service session.

15. The apparatus according to claim 14, wherein the charges indicated for said other participants are dependent only on logically uncombined events indicating respective changes in statuses of the respective participants for which the billing records are produced.

16. A communications service provision support system which supports multiple different types of services during service sessions, said system when in use comprising:
   a service-session manager which performs functions generic to each of said multiple different types of services during service sessions, for each of said multiple types of service, said service-session manager being arranged to instantiate a service-generic service session object to control each service-session, the service-generic service session objects each being arranged, during a service session in which a plurality of participants participate to:
   generate during the service-session a plurality of separate, service-generic service-session behavior related event messages, each event message indicating a logically uncombined event containing no history data, each logically uncombined event indicating a discrete and immediate change in the service-session behavior related status of an individual one of said plurality of participants of the service-session, the respective event messages being generated for at least some of said plurality of participants; and
   transmit said events in the respective event messages being generated for at least some of the plurality of participants;
   a service-generic event handler which receives the transmitted events in the respective separate event messages from each of said service-generic service session objects, and processes the events in the respective event messages from each of the service-generic service session objects, the processing including determining a charge for at least some of the plurality of participants based on that participant's discrete and immediate changes in status including that individual participant's joining and leaving the session as well as each of the other participant's discrete and immediate changes in status including the each of the other participant's joining and leaving the session.

17. A computer-implemented method of generically notifying service-generic service-session behavior related events to a service-generic event handler and processing the events in the service-generic event handler, the events occurring during a plurality of service sessions in which a plurality of participants participate, the service-sessions being provided in a communications service provision support system, said method comprising:
   for at least some of the participants in each service-session, generating during said service-sessions a plurality of separate service-generic service-session behavior related event messages, each event message containing a logically uncombined event containing no history data and comprising a discrete and immediate change in the service-session behavior related status of an individual one of said plurality of participants of the service-session, the discrete and immediate changes in the service session-related status of each of the plurality of participants of the service-session including each individual participant joining the session and that same individual participant leaving the session, separate event messages respectively indicating the joining and leaving of the session of that same individual participant; and
   transmitting said plurality of the separate service-generic service-session behavior related event messages each containing a logically uncombined event to a service-generic event handler, from each of said service sessions; and
   processing in the service-generic event handler the events contained in the separate event messages, the processing including determining a charge for each of the participants based on that participant's discrete and immediate changes in status including that individual participant's joining and leaving the session as well as at least one of the other participant's discrete and immediate changes in status including the other participant's joining and leaving the session.

18. In a telecommunications system, an apparatus arranged to generate billing records for participation in a service session in which a plurality of participants participate, the service session being provided by the telecommunications system, said apparatus comprising:
   means for generating event messages indicating discrete changes in the session-related status of individual participants in said service session, said changes including at least a participant joining the session and that same participant leaving the session, and wherein separate messages are generated in respect of the participant joining the session and in respect of that same participant leaving the session; and
   event-handling means for receiving said event messages and generating a plurality of billing records each containing data indicating a charge for a respective different individual participant's participation in said service session, wherein the generation of a billing record for a particular participant's participation in said service session is performed as a function both of event messages indicating discrete changes in the session-related status of that particular participant and of event messages indicating discrete changes in the session-related status of at least one of the other participant(s) in said service session, such that the charge indicated for said particular participant is dependent on the status of said other participant(s) during said service session and the status of said particular participant.

19. In a telecommunications system, a computer implemented method of generating billing records for participation in a service session in which a plurality of participants participate, the service session being provided by the telecommunications system, the method comprising:
   generating event messages indicating discrete changes in the session-related status of participants in said service session, the changes in the session-related status of participants including each individual participant joining the session and that same individual participant leaving the session, wherein separate messages are generated in respect to each participant joining the session and in respect of that same participant leaving a session; and
   processing the generated event messages to generate a plurality of billing records each containing data indicating a charge for a respective different participant's participation in said service session, wherein the generation of a billing record for a particular participant's participation in said service session is performed as a function both of event messages indicating discrete changes in the session-related status of that particular participant and of event messages indicating discrete changes in the session-related status of at least one of the other participants in said service session, such that the charge indicated for said particular participant is dependent on its own status during the service session and the status of said at least one of the other participants during said service session.

* * * * *